United States Patent
Thoroski (12) 
(10) Patent No.: US 6,649,203 B1
(45) Date of Patent: Nov. 18, 2003

(54) EGGSHELL PROCESSING METHODS AND APPARATUS

(75) Inventor: John H. Thoroski, Winnipeg (CA)

(73) Assignee: MFI Food Canada, Ltd. (CA)

( * ) Notice: Subject to any disclaimer, the term of this patent is extended or adjusted under 35 U.S.C. 154(b) by 0 days.

(21) Appl. No.: 09/692,910

(22) Filed: Oct. 19, 2000

Related U.S. Application Data (60) Provisional application No. 60/160,791, filed on Oct. 21, 1999.

(51) Int. Cl.[7] .................................................. B07B 4/00
(52) U.S. Cl. ........................ 426/299; 426/479; 426/518
(58) Field of Search ................................ 426/299, 479, 426/480, 518, 614

(56) References Cited

U.S. PATENT DOCUMENTS

| | | |
|---|---|---|
| 498,488 A | 5/1893 | Power |
| 2,169,684 A | 8/1939 | Erickson |
| 2,258,537 A | 10/1941 | Calkins |
| 2,440,927 A | 5/1948 | Boss et al. |
| 2,535,980 A | 12/1950 | Yeamans |
| 2,548,812 A | 4/1951 | Patterson |
| 3,552,458 A | 1/1971 | Whitman |
| 3,761,026 A | 9/1973 | Rohmer |
| 3,774,525 A | 11/1973 | Driggs |
| 4,082,856 A | 4/1978 | Zwiep et al. |
| 4,308,290 A | 12/1981 | Fujii |
| 4,396,158 A | 8/1983 | Olsen |
| 4,631,837 A | 12/1986 | Magoon |
| 4,730,790 A | 3/1988 | Williams |
| 5,215,267 A | 6/1993 | Taylor |

FOREIGN PATENT DOCUMENTS

| | | | |
|---|---|---|---|
| JP | 59-49878 | * 3/1984 | ................. 426/299 |
| JP | 60259160 | 12/1985 | |
| JP | 3045264 | 2/1991 | |
| JP | 4042942 B | 7/1992 | |
| JP | 1761296 C | 5/1993 | |
| JP | 08173838 | 7/1995 | |
| WO | WO 98/41326 | 9/1998 | |

* cited by examiner

Primary Examiner—George C. Yeung
(74) Attorney, Agent, or Firm—Fredrikson & Byron, P.A.

(57) ABSTRACT

A method of processing eggshells to separate outer eggshell portions and the membrane portions. The eggshells are dried to remove moisture content and cause at least some separation of the membrane portions from the outer eggshell portions. A first amount of the membrane portions is separated by sieving from the eggshells. The remaining eggshell component is directed to a processing chamber with an impacting zone, where the remaining eggshell component is impacted to reduce the particle size of at least the outer eggshell material to form smaller particles. The outer eggshell particles are collected to a valve, and the membrane portion is pneumatically removed.

30 Claims, 6 Drawing Sheets

EGGSHELL PROCESSING METHODS AND APPARATUS

CROSS REFERENCE TO RELATED APPLICATIONS

This application claims the benefit of the priority of U.S. patent application Serial No. 60/160,791, filed Oct. 21, 1999, entitled "EGGSHELL PROCESSING APPARATUS AND METHOD".

BACKGROUND OF THE INVENTION

The present invention relates to methods and apparatus for the processing of eggshells, and more particularly to such methods and apparatus which are particularly adapted for effectively separating the eggshell membrane from the outer eggshell in a manner that the separated fractions can be used effectively in food products and possibly other uses.

BACKGROUND ART

It is necessary that egg-breaking facilities must dispose of their waste eggshells in some manner, and many companies pay to have their eggshells trucked away to a garbage dump.

In other instances, the eggshells are put to use after being processed in some manner and one prior art method is as follows. After the eggs are cracked and the yolk and albumin are removed, there remains the cracked eggshell, comprising the outer eggshell portion along with the membranes attached thereto, and residual egg liquid. These eggshells are first placed in a centrifuge to get rid of the extra liquid, which can be used for some commercial purposes. In some instances, after liquid removal, the eggshells are used as landfill. In other instances, the eggshells are dried and ground, after which these are used by putting these back into a feed product for chickens.

The way this is accomplished in this prior art method is to first place the eggshells with the membrane in a rotary drum dryer, and this removes the water and also acts as a pasteurizer. From the dryer the eggshells are directed into a hammer mill, which may be conventional. The action of the hammer mill is such that this reduces eggshells to a relatively fine powder.

Then, in accordance with the prior art process, this powdered material, which combines most of the outer eggshells and the membrane are removed from the hammer mill and directed by a suitable conveyor to a collecting system. From there, the powder is taken to a location to be incorporated in the chicken feed product.

A search of the U.S. Patent literature disclose a number of patents which relate to the removal of eggshells from the eggs (the albumen and yolk), where the egg is either already cooked or raw. These patents are the following:

U.S. Pat. No. 4,308,290 (Fujii) discloses a method for peeling the shell from boiled eggs, where a hard-boiled egg is carried through a pipe by a fluid stream that breaks up the shell while the membrane remains unbroken. Then the shell membrane is broken by applying a whirling water stream and a centrifugal force generated by the circular motion.

U.S. Pat. No. 4,082,856 (Zwiep et al) shows a process and apparatus for shelling eggs. The apparatus can be more easily understood by examining FIG. 4 and the text beginning in Column 4, line 51, and continuing on through the first half of Column 5. The hard-boiled eggs first come into the hopper 11, then go through a vibrating chute 13 to crack the egg shell, then go through an orifice section where the shell (including the membrane) is stripped from the egg, then through scrubbing section 17, and finally through the table 19, which has a wire or grill surface. There is a spray at 21 which provides a final cleaning action. The meats 18 of the eggs (less the shells) are directed through a gathering chute 22. The trap or basket 23 gathers and separates the shell debris 16 from the process fluid. The shell fragments and the membrane fall into the container 23, and there is no other discussion as to how these are handled.

U.S. Pat. No. 3,774,525 (Driggs) Shows and apparatus for peeling eggs where the eggs are placed into a rotating cylinder. After the peeling cycle has been completed, so that the shell and the membrane are separated from the egg, the eggs and the shells are then deposited upon a rack which is designed" . . . so that the eggs will roll over the rack to a collecting point while the cracked and broken shells will pass through the rack to a separate collection point. (Column 6, lines 30, 31–33).

U.S. Pat. No. 3,552,458 (Whitman) Shows an "apparatus for deshelling hard-cooked eggs". The eggs first go through an apparatus which cracks the eggshells, and then the removal of the shells is accomplished in the manner shows in FIG. 6, where the eggs are advanced along two rolls 73 and 75 by the belt 85. Jets of water are sprayed on the eggs by the pipes 95 to assist in the removal of the eggshells (presumably with the membrane).

U.S. Pat. No. 2,535,980 (Yeamans) discloses a "hard-boiled eggshell remover" where the eggshell is crushed in a tapered cylinder. In Column 2, beginning on line 7, the last part of the process is described as follows:

"After a few turns of the crank handle, the entire eggshell will be loosened and will fall off and the bare egg, with a clean, whole surface, is then ready to be removed from between the blades and replaced by another egg in its shell."

U.S. Pat. No. 2,548,812 (Patterson) Shows a centrifugal separator where the raw eggs are deposited into a rapidly rotating basket 12. The egg product flows outwardly through the holes, while the shells are retained within the basket 12. The egg material then flows downwardly through the passageway 21 into a collecting reservoir 23. When sufficient eggshells have accumulated in the basket 12, then the machine is stopped and the basket 12 emptied of the eggshells.

U.S. Pat. No. 498,488 (Power) discloses a machine and method for "extracting the contents of eggs" where the raw eggs are placed in a centrifuge which breaks the raw eggshells and separates the whites and yolks from the shells.

Also, there was disclosed in this search three patents relating generally to hammer mills and their operation. These three patents are the following:

U.S. Pat. No. 2,258,537 (Calkins) discloses a hammer mill having an improved construction of a screen to provide for portions of different mesh over the outlet opening of the grinding chamber of the mill.

U.S. Pat. No. 2,440,927 (Boss et al) shows a grinding mill of the hammer-type for grinding feed and the like with a screen which is adapted for remote control adjustment through a wide range.

U.S. Pat. No. 2,169,684 (Erickson) shows a hammer mill for grinding grains, coal, rock and like materials. This relates more to a novel feeding mechanism which will not become clogged by foreign matter.

SUMMARY OF THE INVENTION

The methods and apparatus of the present invention are particularly well adapted to the processing of eggshells so as to separate the components of the eggshell into a form where these could be used as commercially viable products. The present invention comprises several embodiments of the method, and also an apparatus particularly adapted for use in the present invention.

A first embodiment of the present invention is able to separate the eggshell components in a manner that membrane portions can be isolated as a separate product, and also the outer eggshell (comprising essentially calcium carbonate) can be isolated in a near pure form. Further, there can be generated a residual product made up of remaining outer egg shell particles along with some of the membrane.

In this first embodiment, the eggshells (comprising both the outer egg shell portions and the membrane portions) is dried to reduce the moisture content of the eggshells, and also cause at least some separation of the membrane portions from the outer eggshell portions.

Then a first amount of the membrane portions is separated from the eggshells to leave a remaining eggshell component that comprises an outer eggshell component and the remaining membrane portions. The separated membrane portions, could then be used as a commercial product, such as, for example, for use in the pharmaceutical industry.

The remaining eggshell component is directed to a processing chamber of a processing apparatus at an impacting zone. Then the remaining eggshell component is impacted in the chamber to reduce particle size of at least the outer eggshell component to form smaller, outer eggshell particles.

The smaller outer eggshell particles are collected at a collecting location, and a substantial portion of the remaining membrane portions are separated from outer eggshell particles. Also, some of the very small particles of the outer eggshell material (in the form of dust or nearly the particle size of dust) can be removed along with the remaining membrane portions that are processed in the processing chamber of the processing apparatus.

In a preferred form of the present invention, prior to separating the first amount of the membrane portions from the eggshells, the eggshells are agitated to break up the eggshells. Also, the agitating of the eggshells can be accomplished at the same time the eggshells are being dried. This can effectively be accomplished by drying the eggshells in a rotary drum dryer where a tumbling action is imparted to the eggshells to cause the further break up of the outer eggshell material.

Also in preferred form of the present invention, there is a washing of the eggshells prior to the drying of the eggshells to remove egg liquid therefrom. In a specific version described herein, prior to the drying step, the eggshells are subjected to both centrifuging and washing, thus removing egg liquid from the eggshells and also reducing the moisture content.

Further, in the preferred form, the first amount of membrane portions from the eggshells is accomplished by sieving the eggshells. This could be desirably accomplished by using a plurality of sieves, such as sieves having a U.S. mesh size of 6–12 mesh size. One arrangement that has been found to be satisfactory is three sieves having a U.S. mesh sizes of 6,7 and 10.

The impacting of the remaining eggshell component after having the first amount of membrane portions being removed therefrom (as described above) is, in a preferred form of the present invention, accomplished by moving a plurality of impacting members about an axis of rotation in the processing chamber. In general, these impacting members are moved in a circumferential path, and there is a positioning screen member at least partially around the circumferential path. Then as the smaller outer shell particles are formed, these pass through the screen member to descend to a lower portion of the processing apparatus to be collected. It has been found that in the present invention the smaller outer shell particles that are still collected are of a very high purity and are at least ninety seven percent or more calcium carbonate.

In a preferred form, these smaller screen particles are removed from the collecting location by selectively operating a discharge valve at the collecting location. Then the smaller outer eggshell particles descend by gravity through the valve.

Also in the preferred form, the remaining membrane portions along with very fine outer eggshell are removed from the chamber by removing these membrane portions particles and the very fine outer eggshell particles through a membrane portion discharge section. This is accomplished pneumatically by creating a pressure differential between an exit location of the inlet and the chamber. In a preferred form this is accomplished by a pneumatic discharge apparatus which creates a suction (i.e. lower pressure) at the inlet and carries the remaining membrane portions through a pneumatic conveyor.

In an exemplary embodiment of the present invention, the smaller outer eggshell particles that are collected have a particle size of about 600–900 microns. However, the apparatus and/or processing conditions could be varied so as to have larger or smaller particle size such as being as large as 1000, 1300, 1500, 1700, or up to 2000 microns, or as low as 500, 400, 300 microns or lower.

In a further version of the present invention, the smaller outer eggshell particles that are collected could be ground down to a much smaller particle size, to as low as 15 microns. At this particle size the outer egg shell particles (essentially calcium carbonate), when used as food product or a calcium supplement are generally not tasted by the person consuming these. However, the particle size could be made smaller, such as low as 13, 11, 9, 7, or 5 microns. Present analysis indicates that for the presently contemplated applications this reduction to smaller particle sizes would not provide any real benefit, but for some applications it might. Also, it this micron size could be larger such as 17, 19, 21 23, or 25 microns or higher. Again, this may be desirable for some applications, but these larger sizes are believed to be less desirable for use in human food products.

In a second embodiment of the present invention, the eggshells are first dried to reduce the moisture content of the eggshells and cause at least some separation of the membrane portions from the eggshell portions. Then the eggshells are subjected to a sieving process to separate an amount of the membrane portion from the eggshell. Then the membrane portions that are separated are then collected, and then these could be used for various commercial applications. These steps can be implemented in essentially the same manner as described above, including the addition of preferred versions of the same.

In a third embodiment, the eggshells are dried to reduce moisture content of the eggshells and cause at least some separation of the membrane portions from the outer eggshell portions. Then the eggshells are directed to an impact zone of a processing chamber of a processing apparatus, where the eggshells are impacted in the chamber to reduce particle size of at least the outer eggshell portions to form smaller outer eggshell particles. These can be discharged as described previously herein, and also the membrane portions can be removed pneumatically as described previously herein. These steps can be accomplished in substantially the same manner as described above, and in the preferred versions.

The apparatus which is adapted to be used in the present invention comprises a housing which has a processing chamber which comprises a circumferential wall portion which surrounds the chamber, and oppositely positioned side wall sections, which side wall sections, with the circumferential wall section, define the processing chamber. There is an inlet portion to direct the eggshells into the chamber.

The apparatus comprises an impacting portion positioned in an impacting zone of the chamber. This impacting portion comprises at least one impacting member which is rotatably mounted in the chamber to travel a circumferential path to impact the eggshells, so as to break up the eggshells and reduce particle size of at least the outer eggshell portions to form smaller eggshell particles separated from the membrane portions. The apparatus has an outer eggshell particle collecting area positioned below the impact zone to collect the smaller outer eggshell particles at least in part by gravity.

There is a pneumatic outlet portion to pneumatically remove membrane portion particles from the chamber.

In the preferred form, there is a plurality of impacting members which are rotatably mounted about an axis of rotation in the chamber. The impacting members move in a generally circumferential path, and there is further a positioning screen extending at least partially around a circumferential path so that outer eggshell particles pass through the screen member to descend to a collecting location at a lower portion of the processing apparatus. The apparatus further comprises a discharge valve at the collecting location for selectively removing the smaller outer eggshell particles.

Also the present invention includes the products resulting from the methods of the present invention, these products including the outer eggshell particles of a relatively high priority collected from the processing apparatus, and also the membrane portion or fraction derived form the separating (specifically sieving) process.

Other features of the present invention will become apparent from the following detailed description.

DESCRIPTION OF THE PREFERRED EMBODIMENTS a) Introduction

In the following text there will first be a description of the several steps of a first preferred embodiment of the method of the present invention (these steps being described in the following sections b) through f). Then in section g) there will be a description of a preferred apparatus used in the method of the present invention. Finally, section h) presents alternative embodiments.

In this text the term "eggshell" shall mean the hard shell comprising mostly calcium carbonate and the membrane within the hard shell. The term "outer eggshell" shall mean hard shell made mostly of calcium carbonate but without the membrane.

b) Preparation of the Eggshells for the Later Separation Process

The eggshells themselves, which are suitable for use in the present invention, are broken eggshells that result from use of an existing commercial egg-breaking machine, such as a Seymour or Diamond egg-breaking machine. These raw eggshells will generally have a moisture content of between 26–30 percent moisture by weight, and these comprise the outer eggshell, the membrane and residual liquid egg.

The eggshells are directed by a suitable means, such as a screw conveyor to a centrifuge, which is or may be a continuous centrifuge of conventional design. One such centrifuge is made by Food Engineering Services, Inc., Model P3001, which is a basket-type eggshell centrifuge. This centrifuge accomplishes the removal of most of the egg liquid that is adhering to the membrane of the eggshell. Although this egg liquid is not currently used as food, it can be processed to go into a high protein pet food.

After the liquid removal step described above, the eggshells are washed and this can be accomplished in a manner already known in the prior art. For example, the eggshells can be washed in a screw conveyor with either a downward spray washer or a counter current washing system. This washing removes any residual liquid egg that is left on the shell. The liquid egg material could possibly be recovered by ultra filtration where the water under pressure is forced through a semi-permeable membrane which collects the protein material from the water. The flow, temperature and quality of the wash water can be altered to control the purity of the eggshell product, and it is desirable to use warm water (e.g., 40 degrees C.). All fresh water could be used, or a counter flow washing process could be used. After washing, the eggshells are again centrifuged in the manner indicated above to reduce the moisture content. At the completion of the second centrifuging step, the moisture content, due to residual surface water on the eggshells, would be between 13–17 percent of the total weight (i.e., eggshells plus moisture).

c) Drying/Tumbling of the Eggshells

This drying and tumbling can be accomplished simultaneously by placing the eggshells in a drum rotary dryer, which is or may be conventional. For example, a suitable dryer is a large stainless steel drum dryer provided by Food Engineering Services, Inc. This dryer has two gas fired burners which provide the heat, and the drying and tumbling operation is continuous. The eggshells reach a temperature of 88 degrees C. and are held at that temperature for two minutes. A lower drying temperature could be used, possibly as low as 80° C. or 70° C., but has been found to be less effective. However, such lower drying temperatures possibly could be used to preserve certain characteristics of the product. If the temperature is raised too far beyond the 88° C. level and also if the drying period is extended too long, then the membrane may be singed or otherwise damaged.

At the completion of the drying step, the eggshells have a moisture content of between 1–3 percent, based upon the total weight of the eggshell plus any residual moisture.

The drying process has the effect of providing separation of the membrane from the outer eggshell portion. The drying breaks protein attachments in what is called the mammillary knob layer. This is the layer where eggshell growth begins and consists of a layer of proteins that are strongly interwoven and bound to the eggshell matrix. Due to heat that is applied during the drying process, the membrane shrinks. Since the protein to protein bond in the membrane is stronger than the protein to shell bond, it results in the membrane staying together and pulling away from the eggshell matrix.

Further separation of the membrane is accomplished by the tumbling action of the drum dryer.

Also, the tumbling action of the drum dryer causes the eggshells to impact one another and in addition to the separating action of the outer egg material from the membrane, this agitation or tumbling action causes further breaking down of the outer eggshell material into smaller particles.

The eggshells are now clean and dry, and the product taken from the dryer represents 100 percent of the eggshell and membrane production.

d) Separation by Sieving

After the above drying step is completed, the eggshells are delivered to a gyratory sifter where the large pieces of membrane are held back, while the smaller and more dense outer eggshell particles fall through the screen. A suitable gyratory sifter is a Sweco Sifter. Due to the vibratory motion of the sifter, those eggshell membranes that had previously still been attached are now shaken loose from the eggshell. The screens within the sifter have an abrasive effect, which grabs outer eggshell pieces and removes them from the eggshell membrane. It has been observed that the sharp edges of the outer eggshell get caught in the small spaces of the screen and this motion effectively pulls the outer eggshell pieces right off the membrane.

The number of screens and size of the screens can be adjusted to maximize separation of the membranes. For example, a set of three screens could be used, having respective screen sizes of numbers 6, 7 and 10 (U.S. mesh screens).

The sifting action by the rotary action of the sifter also has the effect of causing the eggshell particles to impact one another, and this causes further break up of the outer eggshell material. On the other hand, the membrane pieces that separate from the eggshell remain of a somewhat larger particle size. Therefore, a very high percentage of the membrane pieces are retained on the screens. In general, the membrane particles should be above the size of 2.8 mm (2800 microns), and the outer eggshell particles would be a smaller size so that these would pass through the sieving screens. It is to be understood, of course, that this 2.8 mm separating dimension could vary, depending upon the character of the impacting of the particles.

It has been found that by properly "fine tuning" this sieving process, as much as 90 percent or greater of the membranes by weight can be recovered, this being between six percent to ten percent of 100 percent of the eggshell and membrane product that is taken from the dryer and delivered to the gyratory sifter. At this point there are some outer egg shell pieces incorporated with the membrane.

The membrane product, which is taken from the sifter at this time, can be removed for further processing into value added products. Among the components which are believed to have value are collagen and other specialized proteins which could be used in pharmaceutical products.

With removal of this 6–10 percent membrane, the remaining product for further processing is primarily outer eggshell particles, some having membranes still attached thereto, and also some of the remaining membrane which is of sufficiently small particle size to pass through the gyratory sifter.

This membrane product itself, as produced by the method of the present invention, is one of the components of the present invention.

e) Impacting of the Eggshell Product to Form Smaller Particles and Further Separation of the Same The remaining eggshell product that is taken from the gyratory sifter is then delivered to a hammer mill for further processing. A hammer mill found suitable for use in the present invention is a Schutte Hammer mill, which has been modified to incorporate a pneumatic membrane removal system, along with a lower outlet having a valve.

The hammer mill will be described more completely herein in section g). However, to comment briefly on its basic operation, the hammer mill comprises a generally cylindrical chamber, which is defined by a surrounding screen member and in which there are metal "hammers" that extend radially outwardly from a central hub to which these "hammers" are attached by rods. When the central hub is rotated, the "hammers" move closely adjacent to the cylindrical surface and they will reduce the eggshells to a smaller particle size so that the smaller size particles pass through the screen into a closed outer chamber.

The pneumatic membrane removal system comprises a pneumatic conveying system, such as a Kice Pneumatic Conveying System which includes a rotary airlock, blower and filters. To capture the membrane component, there is provided a pneumatic inlet opening at a lower part of the housing of the hammer mill. With a lower pressure being created at this pneumatic inlet, the lower density membrane particles that are in the hammer mill are drawn into this opening and into the pneumatic conveying system. In addition, this airstream going into the pneumatic conveyor takes out some of the smaller outer eggshell particles (i.e. which is primarily calcium carbonate) and in the form of fine calcium carbonate dust.

Most of the outer eggshell component that has been ground down in the hammer mill has a particle size greater than fine dust, and since it has a relatively high density, this settles toward the bottom part of the hammer mill housing. In a preferred embodiment of the present invention, about 35–39 percent of the total product that is processed in the hammer mill is removed by the pneumatic system (this comprising most all of the membrane particles and the very fine outer eggshell particles), and 53–57 percent of the total product that is processed in the hammer mill collects at the bottom of the hammer mill and is substantially pure eggshell calcium carbonate with minimal protein content from the small membrane content. The 53–57 percent outer eggshell portion (not the membrane) has been ground down in the hammer mill to a size of about 600–900 microns, and this can be removed from the hammer mill by gravity flow through the lower valve.

The portion of the product taken out of the hammer mill by the pneumatic system can be used for animal feed product or possibly other applications. The outer eggshell product in the 600–900 microns could be used for various applications or could be further processed.

With regard to the particle size, this is measured in a manner that for a given particle size specified, ninety percent of the material would be below that specified particle size, while ten percent of the material would be above that particle size. The average particle size could be somewhat higher than 900 microns, for example as high as a 1000, 1200, 1400, 1700 and possibly higher. Likewise, the size could be lower than the 600 micron size specified, such as 500, 400, 300 or possibly lower.

This outer eggshell product, as made by the present invention, has a very high purity and is one of the components of the present invention.

If the eggshell calcium carbonate product that is derived from the hammer mill is to be used as calcium supplements in the food or pharmical industries, it is for some applications desirable that the calcium carbonate product be milled in an ultra-fine mill to achieve a size of 15 microns. At the 15 micron size, the calcium particles are generally not able to be tasted by a person eating the food product. However, for some applications, it may be possible to accomplish this fine grinding to a higher micron size, such as 20 or 25 microns. Also, the micron size could be made yet lower, to 12, 9, 6 or 4 microns, but present analysis indicates that while this may have advantages for some applications, in general, about the 15 micron size would be adequate. Within the broader range, the size could be 12–18 microns or 10–20 microns. In this form, it can either be used as a calcium source for making calcium supplements or it can be added to a variety of food products to increase the calcium content. It is also possible that this fine particle size of these calcium rich eggshells makes them well suited for other industrial uses such as calcium carbonate fillers for paint and plastic industries. One ultra-fine mill that could be used for this purpose is a stainless steel International Process Equipment Company (I.P.E.C.) Rotormill 3000 with a variable speed dynamic air clarifier.

f) Other Processing Options

Within the methods of the present invention, there are a number of alternatives, and these will be described briefly below as additional embodiments.

A second embodiment of the present invention is to follow the steps recited above in sections "b" through "d", so that the raw eggshells are in accordance with section "b" centrifuged and washed, and then passed through the drying/tumbling step of section "c". Then the dried eggshell product is subjected to the sieving (as in section "d"), with the membrane product removed. This membrane product can then be used for a suitable purpose (as described above) such as used in pharmaceutical products, and constitute part of the present invention.

The remaining product (the outer eggshells plus some of the membrane material that is passed through the sieving operation) can then be further processed in the manner of the present invention, or possibly in some other way. For example, the eggshell component along with the remaining fraction of the membrane could simply be placed in a conventional hammer mill and ground into finer particles for animal feed. This could likely be done in the event that the ultra pure calcium carbonate product is not desired at that time. Or the remaining outer eggshell and membrane product can be simply disposed of or processed in some other manner.

Another alternative which is a third embodiment of the present invention is that the steps recited in sections "b" and "c" (the centrifuging and washing plus the tumbling of section "b", and the drying step of section "c" are performed. However, instead of taking the total product from the dryer and delivering it through the sifting process, the product is sent directly to the hammer mill with the pneumatic separating system, as described in section "e". In this embodiment, then the relatively small particles of the outer eggshell (along with substantially all of the membrane which has been reduced to smaller particle size) is pneumatically taken from the hammer mill, while the outer eggshell component (calcium carbonate) collects in the bottom of the hammer mill to be extracted therefrom.

Also, it is to be understood that there could be alternative methods of accomplishing some of the steps. For example, while the washing and centrifuge steps recited in section "b" have found to be quite effective in cleaning and removing the excess moisture of the washing step, these could be accomplished in some other manner. Further, while the tumbling of the eggshell product in a dryer to accomplish both the drying and particle size reduction can very conveniently be accomplished in the rotary dryer, within the scope of the present invention, the tumbling and the drying could be accomplished in separate steps or in some other manner.

g) The Apparatus of the Present Invention

Figure 1:
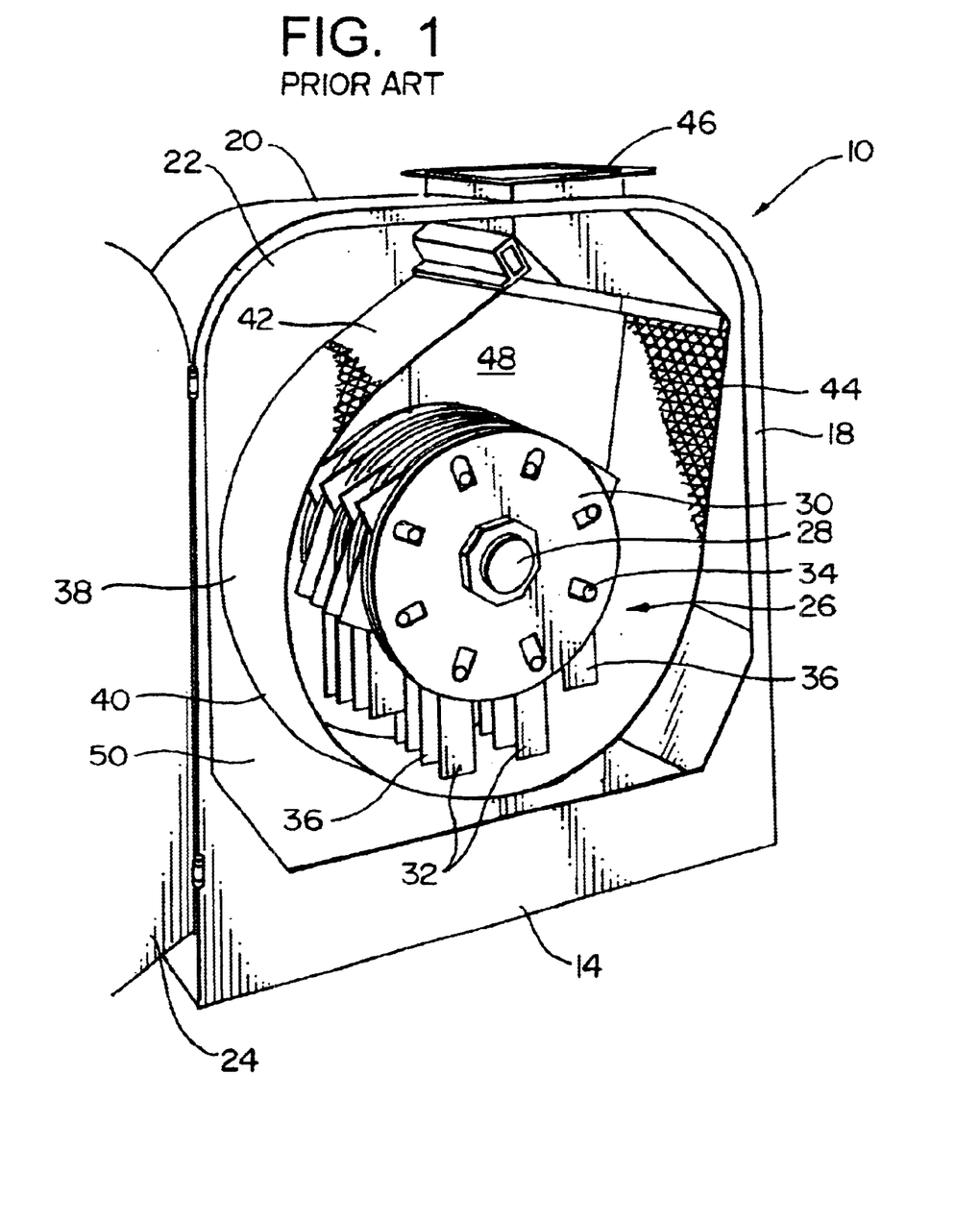
FIG. 1 is an isometric view illustrating an apparatus (specifically a hammer mill) which exist in the prior art, and which is adapted for use in the present invention.

The apparatus of the present invention will now be described with reference to FIGS. 1, 2 and 3. FIG. 1 shows a prior art hammer mill 10 which was modified to be incorporated in the present invention. It can be seen that the apparatus 10 comprises a housing 12 having a base 14, front and rear walls 16 and 18 (only the rear wall 18 being visible in FIG. 1) and a top wall 20. There is a front wall 22, and a door 24 (shown open in FIG. 1) which functions as a rear wall.

Mounted within the housing 10 is a hammer section 26 which comprises a center rotatedly mounted hub 28 which has two side spool plates 30 mounted thereto, and a plurality of hammer elements 32 mounted at their inner ends to rods 34 and extending outwardly therefrom to their outer impact ends 36. When the hub 28 is rotated, the hammer elements 32 extend radially outwardly, as shown in FIG. 2.

There is provided a screen member 38 which extends circumferentially around the hammer section 26. The screen 38 has a circularly curved lower portion 40 extending in a curve moderately larger than 180 degrees, and the screen member 38 has upper portions extending in a planar configuration at 42 and 44, to join to an inlet member 46 positioned in the top wall 20.

In operation, the material to be ground in the hammer mill is fed through the inlet 46 to flow into a chamber 48 defined by the screen member 40 and the front and rear walls 22 and 24. The action of the rotating hammer section 26 is to impact the material in the chamber 48, continuously breaking the material up into smaller particles, with these particles eventually becoming sufficiently small to pass through the screen 38 into an outer chamber 50 that is within the housing 12 and outside of the screen 38. The base 14 is open (or has an opening therein) so that the material that passes through the screen 38 drops downwardly and can be taken out at the lower end of the hammer mill.

The apparatus of the present invention, as indicated above, utilizes the hammer mill 10 shown in FIG. 1 which is adapted for use in the present invention. As shown in FIG. 2, there is a feed auger 52 mounted above the inlet 46 to direct the product continuously into the processing chamber 48, and also a motor 54 which drives the hammer section 26. These are prior art and components that can be part of the original hammer mill 10.

Below the existing hammer mill 10, there is provided a lower housing section 56 having a lower wall portion 58 in which is mounted a product outlet valve 60. This housing 56 is enclosed, and the larger particles of the outer eggshell component (the 600–900 micron size) collect at the lower wall portion 58. These larger particles are continuously taken out of the housing 56 by opening the valve 60 so that the outer eggshell particles (calcium carbonate collected at the lower portion) drop through the valve 60. Or the valve 60 could be operated selectively.

Also, positioned partly in the housing 56 and extending forwardly and outwardly therefrom, is a screw conveyor 62 having an outer tubular housing 64 and a helical conveying member 66. The rear end 68 of the conveyor 62 is located beneath the hammer mill 10.

To remove the lighter membrane particles and also the very small size outer eggshell particles from the hammer mill, there is provided a pneumatic outlet line 68 that leads to the aforementioned pneumatic removal apparatus (such as the Kice Pneumatic Conveying System). Since this pneumatic conveying system is already known in the prior art, this is not described in any detail herein.

The pneumatic conveying tube 68 has an inlet end portion 70 and at the very end of that end portion 70 there is an air inlet valve shown schematically at 72 which can be selectively operated to let in either no air or a moderate amount of air into the inlet end portion 70 of the tube, thus controlling the suction force provided by the pneumatic removal system. The end portion of the tube 70 also has at a location immediately beneath the screw conveyor 56 an opening 74 shown as a broken line circle in the top view of FIG. 3 and shown as an inlet member having a U-shaped configuration in the rear view of FIG. 2.

In operation, the larger outer eggshell particles (i.e., 600–900 microns) fall directly downwardly from the outer hammer mill chamber 50 and collect on the bottom wall 58 where they are taken out through the valve 60. The lighter membrane particles and the very fine outer eggshell portion particles are diverted by the suction created by the pneumatic conveying system to enter into the inlet opening 74 and pass through the tube 68 to be collected in the pneumatic system. During this time, the screw conveyor 62 is operating at a relatively slow RPM to keep the lower housing section 56 from clogging. Also, in the event that the pneumatic inlet 74 or tube 68 clogs, and also the product outlet valve 60 is closed, the screw conveyor 62 is able to discharge the product which collects in the lower housing 56. This could be used as an emergency measure, or it could be used to discharge all of the product from the hammer mill without making any separation, if that type of product is desired.

Figure 2:
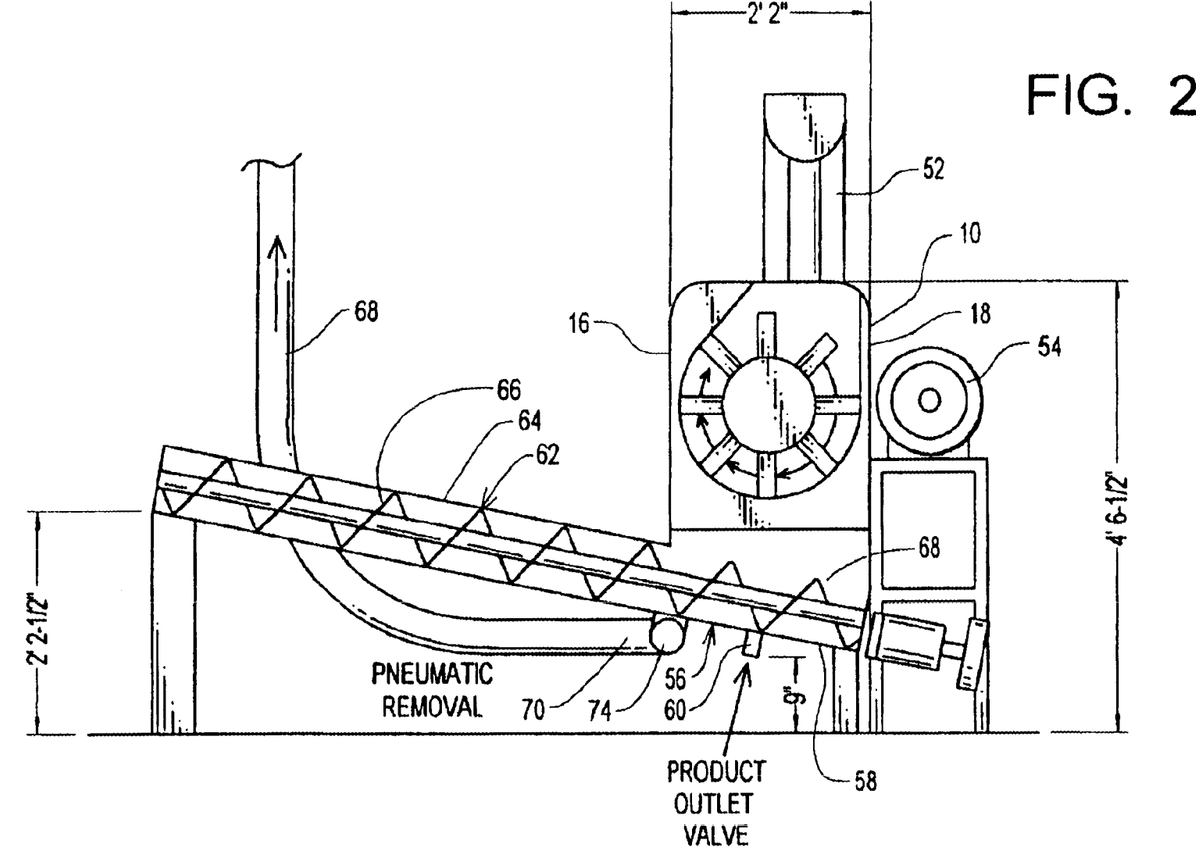
FIG. 2 is a rear elevational view illustrating somewhat schematically the apparatus of the present invention.
Figure 3:
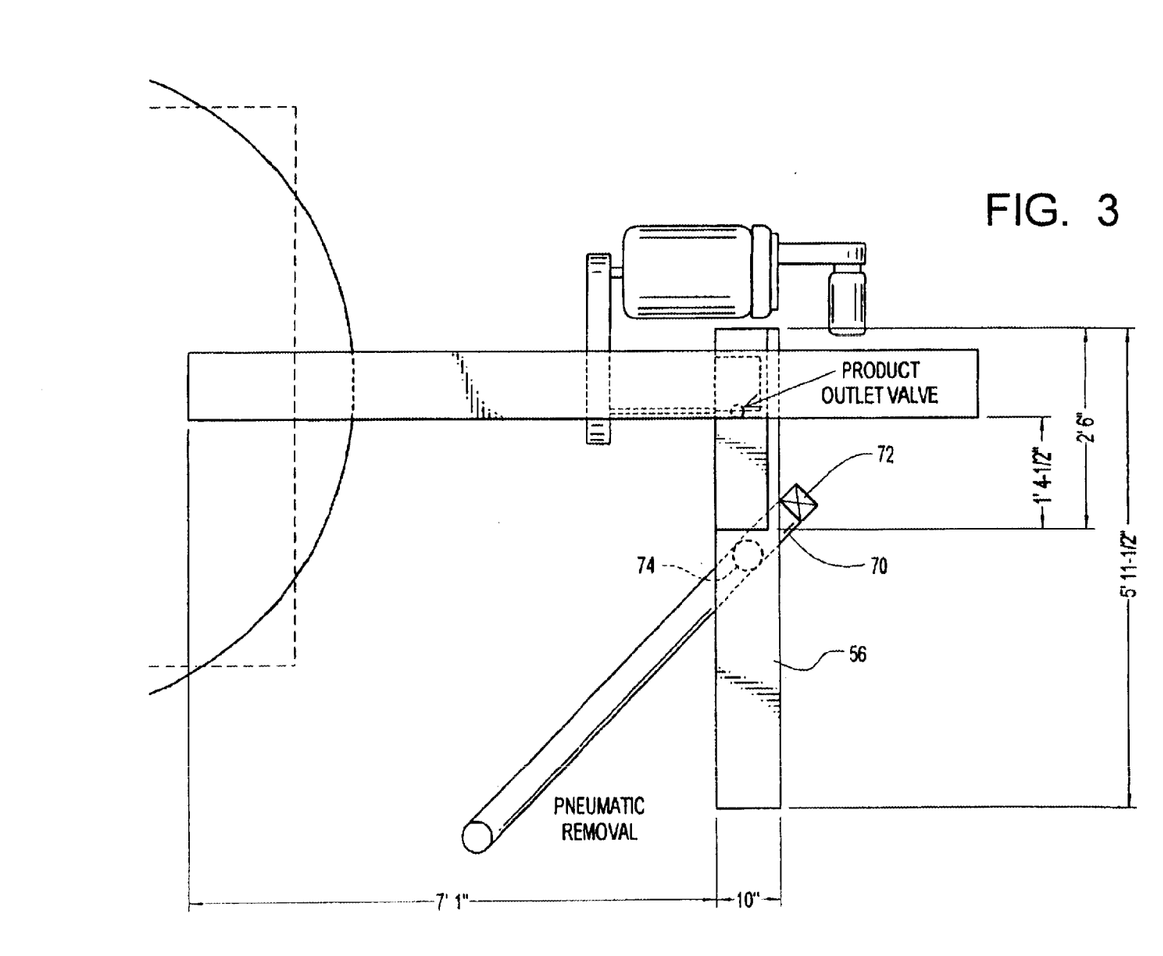
FIG. 3 is a top view of the apparatus of the present invention shown in FIG. 2.

The apparatus shown in FIGS. 2 and 3 represents an existing apparatus which has actually been constructed and operated. It is to be understood that the precise arrangement of these components could be modified to fine tune the system. For example, instead of showing the single pneumatic inlet 74, this could be provided as a plurality of pneumatic inlets at various spaced locations, or the location of the inlet could be moved for fine-tuning. The configuration and arrangement of the housing 56 and the outlet valve 60 could also be modified.

h) Example 1,200 kilograms of raw eggshells were collected from a Seymour egg breaking machine and delivered in a continuous manner to a centrifuge which was a Food Engineering Services, Inc., Model P3001, basket-type eggshell centrifuge to remove the excess liquid from the eggs.

The eggshell product which was taken from the centrifuge was then washed with water to remove any residual egg liquid.

Subsequent to the washing step, the eggshell product was again delivered to another Food Engineering basket-type eggshell centrifuge of the same type for removal of the excess wash water. The eggshell product taken from the centrifuge had a moisture content of about 17 percent.

Next, the eggshell product was delivered continuously into a stainless steel Food Engineering drum dryer and the eggshell product was kept at a temperature of 88 degrees C. for about two minutes. The eggshell product received from the dryer had a moisture content of about one to three percent.

Next, the eggshell product removed from the dryer was delivered to a gyratory Sweco sifter and this sifter was provided with a set of three screens with the top screen having a mesh size of 6, the middle screen a mesh size of 7, and the bottom screen having a mesh size of 10, in accordance with the U.S. mesh designations. The diameter of the screens was approximately 18 inches. This sieving process removed the larger membrane particles from the rest of the product.

After separating the membrane product, the remaining eggshell product, which was substantially all of the outer eggshell particles and a small remaining part of the membranes that passed through the sieve, was delivered to a Schutte hammer mill, modified as described elsewhere herein.

The hammer mill was equipped with the membrane removal system, which was a Kice Pneumatic Conveying System, having a rotary airlock, blower and filters. The hammer mill was operated continuously and the lower outlet valve remained open to receive the larger outer eggshell particles, which were at least 97 percent pure calcium carbonate. The pneumatic system removed the remaining product which was a mixture of very fine outer eggshell particles and membrane particles.

Figure 4:
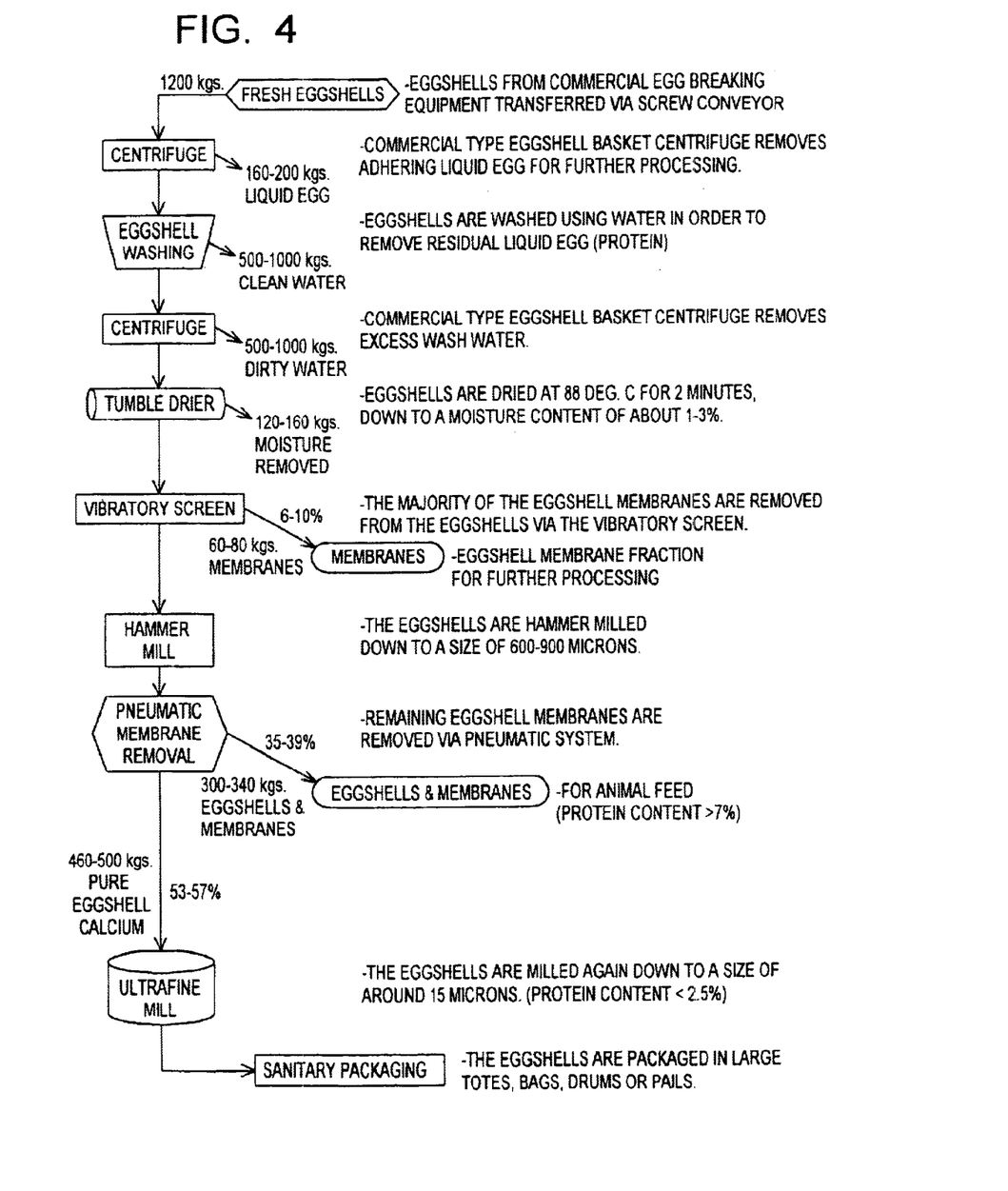
FIG. 4 is a flow diagram illustrating the steps of a first preferred embodiment of the present invention, presenting also various numerical values and information related thereto.
Figure 5:
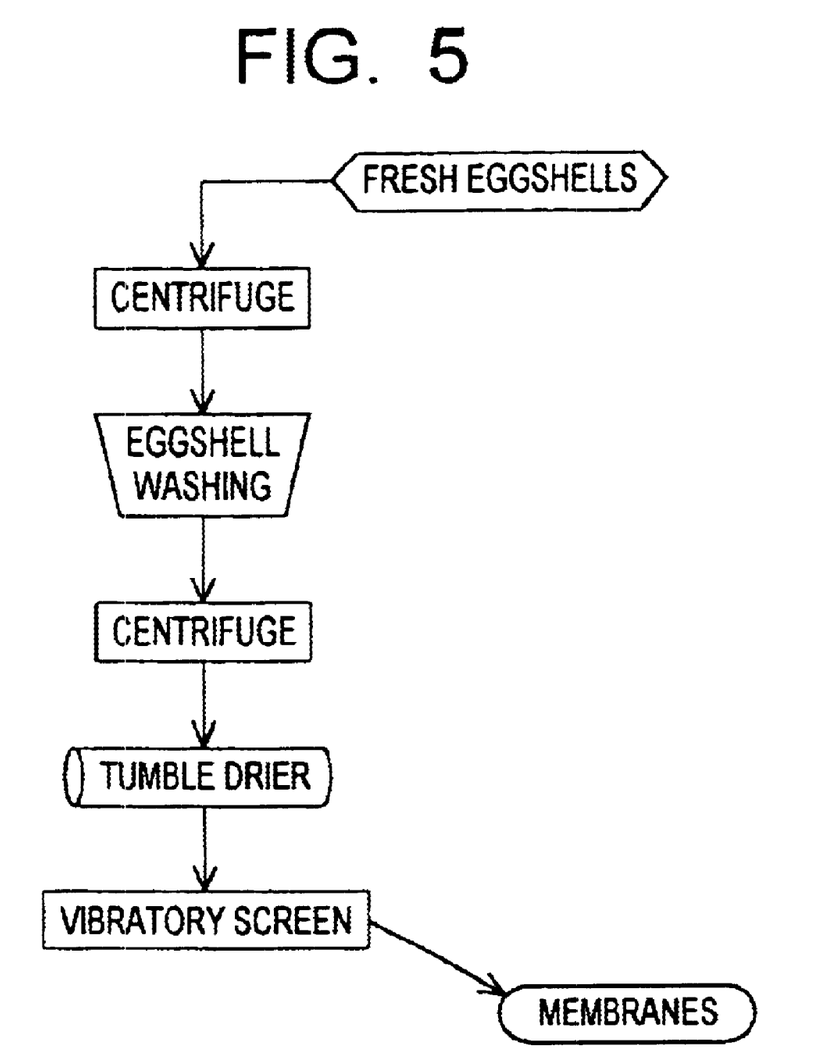
FIG. 5 is a flow diagram of a second embodiment of the present invention.
Figure 6:
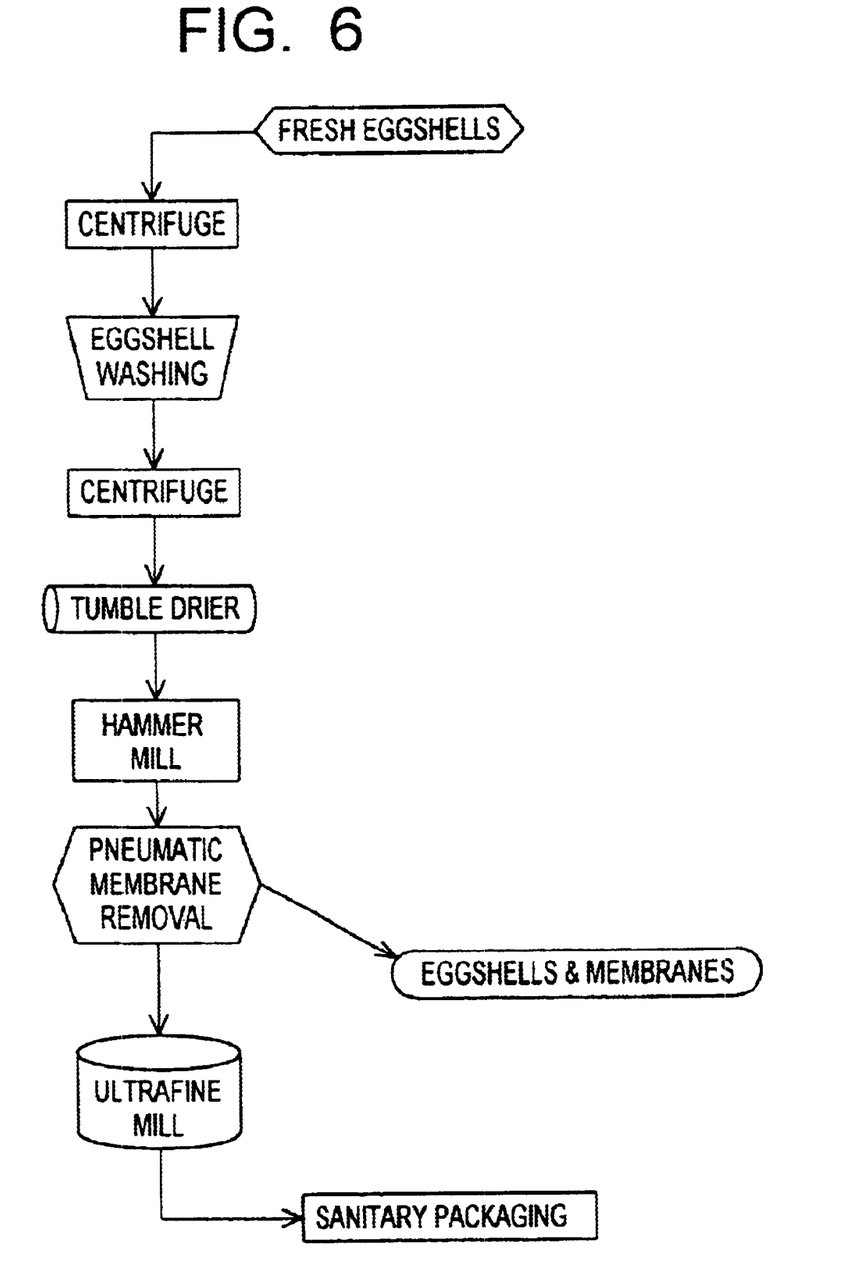
FIG. 6 is a flow diagram of a third embodiment of the present invention.

FIG. 4 is a flow diagram of the method described above, showing various operating conditions and amounts of material at various locations.

It is to be understood that various modifications could be made to the present invention without departing from the basic teachings thereof.

Therefore, I claim:

1. A method of processing eggshells, which comprise the outer eggshell portions and membrane portions, said method comprising:
    a) drying said eggshells to reduce moisture content of the eggshells and cause at least some separation of the membrane portions from the eggshell portions;
    b) separating a first amount of the membrane portions from the dried eggshells to leave a remaining eggshell component comprising an outer eggshell component and remaining membrane portions;
    c) directing the remaining eggshell component to a processing chamber of a processing apparatus at an impacting zone and impacting the remaining eggshell component in the chamber to reduce particle size of at least the outer eggshell component to form smaller outer eggshell particles;
    d) causing at least a substantial portion of the smaller outer eggshell particles to be collected at a collecting location; and
    e) separating at least a substantial portion of the remaining membrane portions from the smaller outer eggshell particles.

2. The method as recited in claim 1, further comprising agitating said eggshells to break up said egg shells prior to separating said first amount of membrane portions from the eggshells.

3. The method as recited in claim 2, wherein said eggshells are agitated while said eggshells are being dried.

4. The method as recited in claim 3, wherein said eggshells are dried in a chamber of a rotary drum dryer, with hot air being directed through said dryer, and with rotation of the drum agitating the eggshells by tumbling.

5. The method as recited in claim 1, further comprising washing said eggshells prior to drying said eggshells to remove egg liquid therefrom.

6. The method as recited in claim 1, further comprising both centrifuging and washing said eggshells prior to drying said eggshells to remove egg liquid from the eggshells and reduce moisture content.

7. The method as recited in claim 1, wherein the separating of a first amount of membrane portions from the eggshells is accomplished by sieving the eggshells.

8. The method as recited in claim 7, wherein said sieving is accomplished with a plurality of screens of different mesh size.

9. The method as recited in claim 1, wherein the impacting of the remaining eggshell component is accomplished by moving a plurality of impacting members about an axis of rotation in said chamber.

10. The method as recited in claim 9, wherein the impacting members move in a generally circumferential path, said method further comprising positioning a screen member at least partially around said circumferential path, and causing the smaller outer shell particles to pass through said screen member to descend to a lower portion of the processing apparatus to be collected.

11. The method as recited in claim 10, further comprising selectively removing said smaller outer eggshell particles from said collecting location by selectively operating a discharge valve at said collecting location.

12. The method as recited in claim 11, further comprising removing the remaining membrane portions from the chamber by removing the remaining membrane portions through an inlet of a membrane portion discharge section by creating a pressure differential between a discharge location at said inlet and said chamber.

13. The method as recited in claim 1, further comprising removing the remaining membrane portions from the chamber by removing the remaining membrane portions through an inlet of a membrane portion discharge section by creating a pressure differential between a discharge location at said inlet and said chamber.

14. The method as recited in claim 1, further comprising grinding the smaller outer eggshell particles to a yet smaller particle size.

15. The method as recited in claim 14, wherein said yet smaller particle size is no greater than about 25 microns.

16. The method as recited in claim 14, wherein said yet smaller particle size is no greater than about 15 microns.

17. A method of processing eggshells which comprise outer eggshell portions and membrane portions, said method comprising:
   a) centrifuging and washing said eggshells;
   b) drying said eggshells to reduce moisture content of the eggshells and cause at least some separation of the membrane portions from the eggshell portions;
   c) separating an amount of the membrane portions from the dried eggshells;
   d) collecting said amount of the membrane portions.

18. The method as recited in claim 17 wherein the amount of the membrane portions is separated by sieving.

19. The method as recited in claim 18, wherein said eggshells are agitated while said eggshells are being dried to reduce particle size of the egg shells.

20. The method as recited in claim 17, wherein said eggshells are dried in a chamber of a rotary drum dryer, with hot air being directed through said dryer, and with rotation of the drum agitating the eggshells by tumbling.

21. A method of processing eggshells, which comprise the outer eggshell portions and membrane portions, said method comprising:
   a) drying said eggshells to reduce moisture content of the eggshells and cause at least some separation of the membrane portions from the outer eggshell portions;
   b) directing the dried eggshells to a processing chamber of a processing apparatus at an impacting zone and impacting the eggshells in the chamber to reduce particle size of at least the outer eggshell portions to form smaller outer eggshell particles;
   c) causing at least a substantial portion of the smaller outer eggshell particles to be collected at a collection location; and
   d) pneumatically separating at least a substantial portion of the membrane portions from the smaller outer eggshell particles.

22. The method as recited in claim 21, wherein the impacting of the dried eggshells is accomplished by moving a plurality of impacting members about an axis of rotation in said chamber.

23. The method as recited in claim 22, wherein the impacting members move in a generally circumferential path, said method further comprising positioning a screen member at least partially around said circumferential path, and then causing the smaller outer shell particles to pass through said screen member to descend to a lower portion of the processing apparatus to be collected.

24. The method as recited in claim 23, further comprising selectively removing said smaller outer eggshell particles from said collecting location by selectively operating a discharge valve at said collecting location.

25. The method as recited in claim 21, further comprising selectively removing said smaller outer eggshell particles from said collecting location by selectively operating a discharge valve at said collecting location.

26. The method as recited in claim 25, further comprising removing remaining membrane portions from the processing chamber by removing the remaining membrane portions through a membrane portion discharge section by creating a pressure differential between an exit location at said inlet and said chamber.

27. The method as recited in claim 21, further comprising removing the separated membrane portions from the chamber by removing the separated membrane portions through a membrane portion discharge section by creating a pressure differential between said membrane discharge section and said chamber.

28. The method as recited in claim 21, further comprising grinding the smaller outer eggshell particles to a yet smaller particle size.

29. The method as recited in claim 28, wherein said yet smaller particle size is no greater than about 25 microns.

30. The method as recited in claim 28, wherein said yet smaller particle size is no greater than about 15 microns.

* * * * *